Patented Nov. 12, 1929

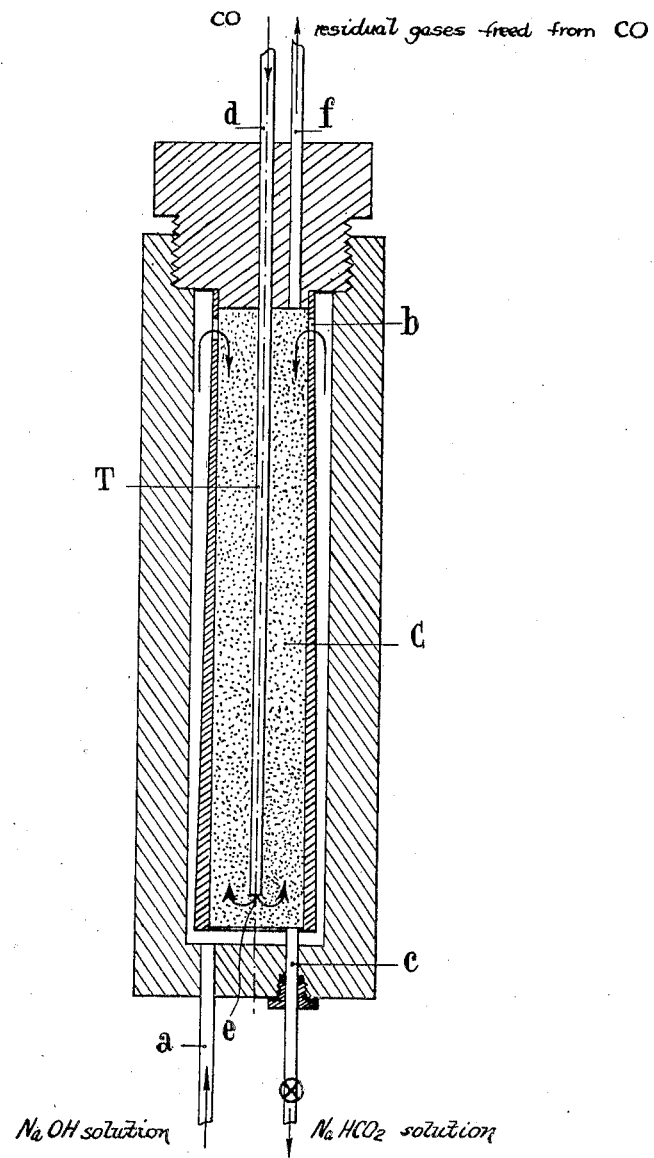

1,735,107

UNITED STATES PATENT OFFICE

GEORGE CLAUDE, OF PARIS, AND ALBERT HENRI GOSSELIN, OF MONTEREAU, FRANCE, ASSIGNORS TO LA SOCIETE CHIMIQUE DE LA GRANDE PAROISSE, AZOLE & PRODUITS CHIMIQUES OF PARIS, FRANCE

PROCESS FOR PRODUCING SIMULTANEOUSLY FORMATES AND GASEOUS MIXTURES RICH IN HYDROGEN

Application filed January 9, 1926, Serial No. 80,296, and in France January 17, 1925.

The object of the present invention is the production of formates from gases rich in carbon monoxide, such as those separated from hydrogen in the partial liquefaction of water gas or gases similar thereto, the CO content of these gases being very high.

After the passage of the gases through the apparatus where the synthesis of formate takes place, the residual gases rich in hydrogen and which may still contain 40-50% and even higher of CO, can be returned to the liquefaction apparatus and then mixed with water gas which has not yet been treated. The entire initial CO content of the gas can be utilized in producing formate and under conditions which, due to the high extent of such content, allow very high reaction speeds and small dimensions of the synthesis apparatus. The gases rich in CO coming from the liquefaction apparatus are free from $CO_2$ and from $H_2S$ and other organic sulphur compounds, which renders them especially suitable for the synthesis of pure formates.

Under these conditions, it has been found possible, in operating continuously with caustic alkali solutions or with caustic alkali-earth suspensions, to obtain an extremely rapid absorption of the carbon monoxide, so much so as to reduce to 10 seconds for example the period of contact between gas and liquid for transformation of 95% of the caustic alkali into formate, whereas the known processes, whether continuous or discontinuous, require a contact period of 1-8 hours in order to obtain the same result. This has been accomplished by raising the temperature and the pressure beyond the usual limits (for example, 200° C. and 200 atmospheres, according to Haber) to 400° C. and 400 atmospheres, in regions where it was not suspected that concentrated solutions of alkali formates would be stable. Indeed, it is possible to use caustic soda solutions, for example, containing 400 grams of caustic soda per liter, which corresponds to 700 grams of formate per liter; and the high initial CO content would certainly also favor this reaction speed, as has been stated above.

On the other hand, however, with such a rapid reaction taking place in such a concentrated medium and at so high a temperature, the usual devices would be incapable of protecting the apparatus and of dissipating the considerable quantity of reaction heat, so that special means or devices must be employed for limiting and regulating the temperature.

The gaseous and liquid substances to be combined are brought to the desired reaction temperature (350° C., for example), at the expense of the heat of reaction, in order to keep the temperature of the reacting substances constant. It will be noted that under the high concentration conditions indicated, the heat of reaction corresponds to a temperature rise of about 260° C. for the liquid and gaseous mass, so that the application of the above principle will thus properly entail absorption of the heat given off (19 calories per milligram) plus a slight addition. Hence, the temperature of operation is regulated by the preliminary heating of the liquid (110° C., for example).

The desired result can be obtained by means of the construction represented in section in the single figure of the accompanying drawing.

The liquid supplied under pressure by a pump (not shown) through pipe $a$ enters the bottom of the cylindrical chamber which supports the pressure, in a cold or slightly heated state due, for instance, to the sensible heat of the outgoing liquid or to electrical heating, and then rises in the cylinder along the wall of the inner reaction chamber C (which is made of non-conducting material or of a metal having a suitable degree of conductivity) absorbing the reaction heat as the latter is developed, in order that it may have attained the desired temperature by the time it reaches the end of its path, at which point it passes into said chamber through the inlet openings $b$. The liquid then descends through the chamber, which contains filling material or plates, and escapes at the bottom through an outlet pipe $c$ fitted with a stuffing-box and a controlling valve. The gas is supplied under a pressure of 400 atmospheres through a pipe $d$ and then through a continuation T thereof which extends almost to the bottom of the chamber, so that on leaving the lower end $e$ of pipe T it flows upward through the chamber in counter-current with the liquid and likewise becomes heated at the expense of the reaction heat. Finally, the gas escapes at the top of the chamber through an outlet pipe $f$, deprived to the desired extent of its carbon monoxide; both the gas and the liquid leaving the apparatus at the reaction temperature. The chamber C, with the pipes $d$, T and $f$, constitutes a removable take-down cartridge.

Besides solving the essential problem of correct absorption of the reaction heat, the construction described above meets several requirements, to wit: In the first place, the calorific gaseous mass is insignificant as compared with the calarific mass or body of liquid, so that the largest possible surface for heat exchange is thus reserved for heating the liquid—that is to say, the outer surface of the reaction chamber C—while, furthermore, the conductivity of the wall of said chamber can be suited to the amount of heat to be transmitted; i. e., the conductivity can be made higher, for example, according as the quantity of liquid to be circulated per unit of time is increased. On the other hand, sufficient surface for heating the gas is afforded merely by the pipe T; and as the calorific body of gas is very small, it is hardly necessary to take into consideration the more or less methodical manner in which the heat is borrowed from the reacting materials.

In consequence, it is possible to construct said pipe, as well, indeed, as the internal wall of the reaction chamber C, of a metal, such as copper, which will not assist the reaction $2CO = CO_2 + C$; whereas the iron, steel or nickel, which are almost necessarily constituents of the pressure cylinder and which would act from 300° C. as catalyzers on the carbon monoxide unless a protective lining were provided, contact only with the liquid. Indeed, there is no trace of carbon monoxide or dioxide formation with an apparatus constructed as above described, even when operating at 325° C.

The apparatus is provided externally with an electric circuit for initial heating which can also be used for temperature regulation, unless it be preferred to introduce the liquid, at the beginning of operation, after it has been heated under pressure electrically or otherwise, into a coil inserted in the system. But if it is desired to avoid substantial heating of the pressure cylinder, the concentration of the caustic alkali solution can be reduced, with resultant decrease in heat development, and the solution can be caused to circulate in contact with a wall which would abstract from the sensible heat of the issuing liquid or gas a part equal to the decrease in heat development, previous to absorbing, as above, the reaction heat as the latter is developed. The pressure cylinder would then be protected against the high temperature by the liquid screen at the inception of the heating, and in such case the external heating circuit would have to be replaced by an internal electric heating device.

It is to be noted that in the present process there is no strict limitation in respect of suitable pressures, as is the case in the synthesis of ammonia. In ammonia synthesis, the more the pressure increases the higher is the grade obtained, so that the amount of heat developed becomes, with the usual catalyzers and as soon as the pressure exceeds 1000 atmospheres, greater than the amount required to heat the incoming gases to reaction temperature. In the preparation of formates, on the contrary, with which the present process deals, the amount of heat developed with, say, a solution containing 500 grams of NaOH per liter will always be the same, only the reaction rapidity being quickened, which will permit production and carbonic oxide exhaust to be increased. Hence, in the preparation of formates, there is no occasion to limit the maxium pressure, as pressures much higher than those employed in ammonia synthesis can be used—that is to say, pressures much higher than 200 atmospheres.

If the concentrated caustic soda solution is obtained in the usual way by treating sodium carbonate with lime, it will necessitate preliminary concentration of the very weak solutions obtained by that treatment. By taking advantage of the high circulation velocities permitted with the present process, it is possible to circulate directly through the apparatus milk of lime and $Na_2CO_3$ corresponding to the desired caustic soda concentration. Only a small amount of caustic soda is free in this liquid; but in proportion as it is transformed into formate, equilibrium is interrupted and fresh quantities of caustic soda are freed with corresponding formation of $CaCO_3$, thus avoiding evaporation of very weak solutions. It has even been found possible, under the temperature and pressure conditions stated, to use a milk of lime devoid of caustic soda content, which will become converted into formate under analogous heat development conditions.

The process is applicable to all thermic reactions which require the feeding and heating, at the expense of reaction heat, of two distinct currents of fluids.

Having described our invention, we claim:

1. A process of producing formates, comprising subjecting a gas rich in carbon monoxide to the action of a caustic alkali solution under a pressure above 200 atmospheres and at a temperature of 200 to 400° C.

2. A process of producing formates, comprising subjecting a gas rich in carbon monoxide to the action of a caustic alkali solution under a pressure and at a temperature of approximately 400 atmospheres and 400° C.

3. A process of producing formates, comprising subjecting a gas rich in carbon monoxide to the action of a caustic alkali solution under a pressure above 200 atmospheres and at a temperature of 200 to 400° C., while maintaining them in contact for a period of about 10 seconds only.

4. A process of producing formates, comprising subjecting a gas rich in carbon monoxide to the action of a caustic alkali solution under a pressure and at a temperature of approximately 400 atmospheres and 400° C., while maintaining them in contact for a period of about 10 seconds only.

5. A process of producing formates, comprising circulating in counter-current at high velocities through a reaction chamber a gas rich in carbon monoxide and a caustic alkali solution under a pressure above 200 atmospheres and at a temperature of 200 to 400° C.

6. A process of producing formates, comprising circulating in counter-current at high velocities through a reaction chamber a gas rich in carbon monoxide and a caustic alkali solution under a pressure and at a temperature of approximately 400 atmospheres and 400° C.

GEORGES CLAUDE.
ALBERT HENRI GOSSELIN.